(12) United States Patent
Grandou et al.

(10) Patent No.: US 7,783,869 B2
(45) Date of Patent: Aug. 24, 2010

(54) ACCESSING BRANCH PREDICTIONS AHEAD OF INSTRUCTION FETCHING

(75) Inventors: Gilles Eric Grandou, Plascassier (FR); Stephane Eric Sebastien Brochier, Chateauneuf de Grasse (FR); Louis-Marie Vincent Mouton, Vallauris (FR)

(73) Assignee: ARM Limited, Cambridge (GB)

( * ) Notice: Subject to any disclaimer, the term of this patent is extended or adjusted under 35 U.S.C. 154(b) by 339 days.

(21) Appl. No.: 11/641,120

(22) Filed: Dec. 19, 2006

(65) Prior Publication Data

US 2008/0148028 A1    Jun. 19, 2008

(51) Int. Cl.
    *G06F 9/00*    (2006.01)
(52) U.S. Cl. ...................... 712/238; 712/237
(58) Field of Classification Search ................. 712/237, 712/238
    See application file for complete search history.

(56) References Cited

U.S. PATENT DOCUMENTS

| | | | |
|---|---|---|---|
| 6,263,427 B1 * | 7/2001 | Cummins et al. | 712/236 |
| 6,880,066 B2 * | 4/2005 | Suetake | 712/207 |
| 7,185,186 B2 * | 2/2007 | McDonald | 712/238 |
| 7,328,332 B2 * | 2/2008 | Tran | 712/238 |
| 7,337,271 B2 * | 2/2008 | Emma et al. | 711/117 |
| 7,398,377 B2 * | 7/2008 | McDonald et al. | 712/238 |
| 7,441,110 B1 * | 10/2008 | Puzak et al. | 712/237 |
| 7,493,480 B2 * | 2/2009 | Emma et al. | 712/240 |
| 2006/0224871 A1 * | 10/2006 | Tran | 712/239 |

OTHER PUBLICATIONS

Reinman, Glenn, Calder, Brad, Austin, Todd. "Optimizations enabled by a decoupled front-end architecture" IEEE Transactions on Computers, vol. 50, No. 4, Apr. 2001, p. 338-355.*

Reinman, Glenn, Calder, Brad, Austin, Todd. "A scalable front-end architecture for fast instruction delivery" Proceedings of the 26th International Symposium on Computer Architecture, May 1999, pp. 1-12.*

* cited by examiner

Primary Examiner—Jacob Petranek
(74) Attorney, Agent, or Firm—Nixon & Vanderhye P.C.

(57) ABSTRACT

A data processing apparatus is disclosed that comprises: a processor for processing a stream of decoded instructions; a prefetch unit for fetching instructions within a stream of instructions from a memory prior to sending said stream of instructions to said processor; branch prediction logic operable to predict a behaviour of a branch instruction; a branch target cache for storing predetermined information about branch operations executed by said processor, said predetermined information comprising: identification data for an instruction specifying a branch operation and data relating to whether said branch is taken or not; wherein said data processing apparatus is operable to access said branch target cache and to determine if there is data corresponding to instructions within said stream of instructions stored within said branch target cache and if there is to output said data; said data processing apparatus further comprising: a data store operable to store data indicative of a behaviour of a branch instruction; and said data processing apparatus is operable over a period of time to access predetermined information corresponding to more instructions within said branch target cache than instructions it prefetches from said memory such that said accesses to said branch target cache develop an advance in said instruction stream with respect to accesses to said memory; and said prefetch unit is operable to access said data store and to determine if there is data corresponding to an instruction within said data store that indicates that said instruction specifies a branch operation that will be taken and will cause a change in instruction flow.

15 Claims, 6 Drawing Sheets

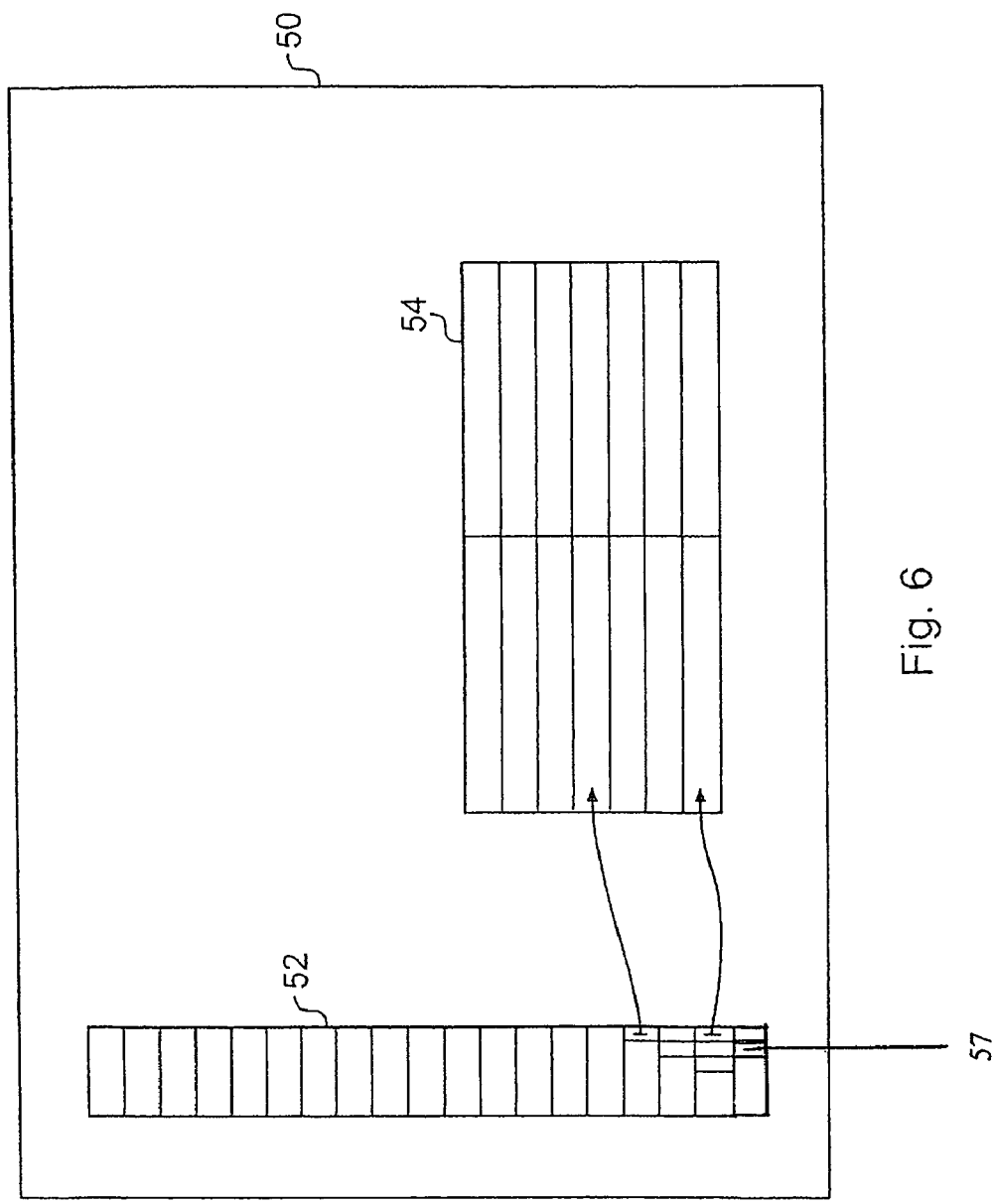

ACCESSING BRANCH PREDICTIONS AHEAD OF INSTRUCTION FETCHING

BACKGROUND OF THE INVENTION

1. Field of the Invention

This invention relates to the field of data processing systems. More particularly, this invention relates to the field of predicting branch instructions in data processing 2. Description of the Prior Art A data processing apparatus will typically include a processor core for executing instructions. Typically, a prefetch unit will be provided for prefetching instructions from memory that are required by the processor core, with the aim of ensuring that the processor core has a steady stream of instructions supplied to it, thereby aiming to improve the performance of the processor core.

To assist the prefetch unit in its task of retrieving instructions for the processor core, prediction logic is often provided for predicting which instruction should be prefetched by the prefetch unit. The prediction logic is useful since instruction sequences are often not stored in memory one after another, since software execution often involves changes in instruction flow that cause the processor core to move between different sections of code depending on the task being executed.

When executing software, a change in instruction flow typically occurs as a result of a "branch", which results in the instruction flow jumping to a particular section of code as specified by a target address for the branch. The branch can optionally specify a return address to be used after the section of code following the branch has processed.

Accordingly, the prediction logic can take the form of a branch prediction unit which is provided to predict whether a branch will be taken. If the branch prediction unit predicts that a branch will be taken, then it instructs the prefetch unit to retrieve the instruction that is specified by the target address of the branch, and clearly if the branch prediction is accurate, this will serve to increase the performance of the processor core since it will not need to stop its execution flow whilst that instruction is retrieved from memory. Typically, a record will be kept of the address of the instruction that would be required if the prediction made by the branch prediction logic was wrong, such that if the processor core subsequently determines that the prediction was wrong, the prefetch unit can then retrieve the required instruction.

Branch prediction logic has been used in conjunction with branch target address caches (BTACs). In order to improve branch prediction success rates, dynamic branch prediction can be performed which uses historical information about what happened on previous branch instructions to predict what may happen. This historical information is typically stored in a BTAC, the BTAC being accessed by the prediction logic to determine if a branch should be taken or not.

Typically in such systems the program fetch unit PFU looks up the program counter to access the instruction within the I-cache and at the same time accesses the BTAC to see if there is an entry corresponding to that instruction. If the instruction that is fetched is a branch instruction the processor awaits the result from the BTAC look up to predict whether to branch or not. Such systems will have some latency as data accesses take a finite amount of time. Typical systems have a two cycle latency, thus two cycles are required before the information from the BTAC is accessed and branch prediction for the retrieved instruction can be performed. In some systems buffers have been used to store fetched instructions and their branch predictions in order to avoid this wait manifesting as bubbles in the pipeline. In this way the bubbles can be hidden and a continuous flow of instructions can be provided to the pipeline.

FIG. 1 schematically shows a system and timing diagram of the prior art with a two cycle latency. Program counter 10 provides a value indicating the next instruction to be fetched to both the I-cache 20 and the branch target cache (BTAC) 30 in parallel. As is shown two bubbles are introduced into the system due to the latency. Although this can be removed using buffers to store instructions before sending them to the pipeline. A further disadvantage of such a system is that as the instructions 2 and 3 are accessed when they are not required this increases power consumption. In systems with a latency of more than two cycles further unnecessary data accesses will be made.

FIG. 2 shows an alternative embodiment in which the problem of unnecessary additional cache accesses is reduced by accessing the BTAC in advance of the instruction cache. If there is a two cycle latency this can be done two cycles in advance and allows the prediction for a branch to be available when an access to the instruction cache for the subsequent instruction is to be initiated this allows the predicted instruction to be fetched rather than the subsequent one in the instruction stream and avoids the need to fetch the two additional instructions (2 and 3) that are not needed. However, the core then has to wait for two cycles until this instruction (10) is returned, thus bubbles are introduced into the instruction stream. Although these can be removed with an intermediate buffer, this leads to an increase in instruction fetch latency. A further potential problem with such a system is where two branches occur next to each other.

SUMMARY OF THE INVENTION

A first aspect of the present invention provides a data processing apparatus comprising: a processor for processing a stream of decoded instructions; a prefetch unit for fetching instructions within a stream of instructions from a memory prior to sending said stream of instructions to said processor; branch prediction logic operable to predict a behaviour of a branch instruction; a branch target cache for storing predetermined information about branch operations executed by said processor, said predetermined information comprising: identification data for an instruction specifying a branch operation and data relating to whether said branch is taken or not; wherein said data processing apparatus is operable to access said branch target cache and to determine if there is data corresponding to instructions within said stream of instructions stored within said branch target cache and if there is to output said data; said data processing apparatus further comprising: a data store operable to store data indicative of a behaviour of a branch instruction; and said data processing apparatus is operable over a period of time to access predetermined information corresponding to more instructions within said branch target cache than instructions it prefetches from said memory such that said accesses to said branch target cache develop an advance in said instruction stream with respect to accesses to said memory; and said prefetch unit is operable to access said data store and to determine if there is data corresponding to an instruction within said data store that indicates that said instruction specifies a branch operation that will be taken and will cause a change in instruction flow.

By providing a data store that in effect decouples the BTAC logic (prefetch stage) from the memory logic (fetch stage) in conjunction with a processing apparatus that allows BTAC accesses to be performed "more quickly" than memory accesses the processing apparatus can start by accessing the two together for an instruction thereby allowing an instruction to be fetched at once and reducing fetch latency. However, as things progress the BTAC accesses will take an advance on the memory accesses so that if an instruction does branch this information may be available before instructions subsequent to it have been accessed from the memory. Thus, unnecessary accesses can be reduced. Furthermore, the presence of a data store allows the advance to progress and thus, if several branches occur one after the other the data may already be in the data store and thus, the predicted instructions can be fetched without producing bubbles in the instruction stream.

In some embodiments, said branch prediction logic is operable to predict from said data output by said branch target cache whether said instruction specifies a branch operation that will be taken and will cause a change in instruction flow, and if so to output a target address from which a following instruction should be fetched, said data store being operable to store identification data for said instruction and said target address.

Although information relating to a predicted behaviour of a branch instruction can be stored in the BTAC itself in some embodiments and be directly accessed, in others the BTAC does not store this information but stores other information such as historical data relating to the previous behaviour of a branch instruction. This can be used by the branch prediction logic to predict a target address. This target address is then stored in the data store. Thus, the prefetch unit accessing the data store can see immediately a target address.

In some embodiments, said data processing apparatus is operable after retrieving said data from said data store to evict said data from said data store.

Although, the data store and access to the data store can be implemented in a number of ways, it is found to be convenient to implement it such that data is evicted from the data store once it has been retrieved.

In some embodiments, said data store comprises two portions, and for each instruction for which an access is made to said branch target cache, data relating to said instruction is stored in a first portion, and for instructions that said branch prediction logic predict to be branch instructions further data including said target address are stored in said second portion, a flag being set in said first portion to indicate storage of said further data.

The splitting of the data store into two parts, such that data relating to all instructions accessed in said branch target cache are stored in the first part, along with a flag indicating if there is further data in the second portion, allows for accesses to said data store to be performed efficiently. The accesses to the first portion are made sequentially, a flag providing an indication of any corresponding entry in the second portion. This avoids the need for the use of long comparators to identify instructions stored in the first portion, as all instructions are stored they can just be accessed one after the other.

In some embodiments, said data processing apparatus is operable to retrieve data from said first portion for each instruction and in response to detecting said flag, to retrieve data from said second portion and after retrieving said data from said data store to evict said data from said data store.

If a flag indicates data in the second portion this is accessed and the corresponding instruction identified using comparators. Once data has been accessed it is evicted allowing room for more data to be stored.

In some embodiments said data processing apparatus is operable in response to detecting said first portion of said data store is full to stall operation of said branch target cache until data has been evicted from said data store.

If the data is evicted after it has been retrieved, it makes it a simple matter to know when the first portion of the data store cannot contain any more information, in other words it is full. In such an event the BTAC is stalled until some data is evicted from the data store. This is not a problem, as when the data store is full then the BTAC must have a large advance with respect to instruction fetching and thus, a lot of information regarding the branching of instructions that are to be fetched is already available. It is only the first portion of the data store that is full that causes the BTAC accesses to be stalled.

In some embodiments, in response to detecting said second portion of said data store is full said data processing apparatus is operable to indicate via a further flag in said first data store that said instruction is a branch instruction for which no information is stored in said second portion.

If the second portion is full this is indicated by a flag that no additional information is present and therefore this information needs to be retrieved from the BTAC itself. Thus, rather than stalling the processor in such a situation it is dealt with by predicting the branch at the time the instruction is fetched.

In some embodiments, the data processing apparatus further comprises a first program counter indicating an instruction to be fetched from memory; a second program counter indicating an instruction to be accessed in said branch target cache; wherein said second program counter has a value equal to or in advance in said instruction stream to a value in said first program counter; said branch prediction logic is operable in response to predicting said predetermined information output from said branch target cache corresponds to an instruction that specifies a branch operation that will be taken to update said second program counter to said target address of said branch; and said prefetch unit is operable to access said data store and to determine if there is data corresponding to a value of said first program counter stored within said data store and if there is to retrieve said data and to update said first program counter with a value of said target address stored associated with said value.

The use of two program counters is a convenient way to change the instruction flow that is both being fetched and from which predicted information is to be stored. As accesses to the BTAC are made in advance of those to the memory, two program counters are needed so that instructions from the instruction stream at two different points can be either fetched or information relating to them accessed from the BTAC.

In some embodiments, said data processing apparatus is operable to access predetermined information corresponding to at least two instructions within said branch target cache for at least some of said branch target accesses and to output said predetermined information.

Although, the accesses to the BTAC can take an advance over accesses to the memory in a number of ways, in some embodiments, this is done by accessing data corresponding to two instructions for each BTAC access and only accessing one instruction in the memory. Thus, it can be seen that in a fairly quick manner the accesses to the BTAC will take an advance on the accesses to the memory.

In some embodiments, said branch target cache comprises a set associative cache comprising at least two ways.

If data corresponding to two instructions is to be retrieved in each access, a convenient way to implement the BTAC is to implement it as a two way set associative cache.

In other embodiments, said data processing apparatus is operable to access said branch target cache more frequently than it accesses said memory.

Alternatively, rather than accessing more than one instruction for each access, it could be that the BTAC will be simply accessed more frequently than the memory.

In some embodiments, said data processing apparatus is operable to resolve if a branch is taken or not and in response to detecting that a branch has been mispredicted is operable to force said first and second program counters and flush said data store.

In response to detection that a branch has been mis-predicted, the instruction flow needs to return either to the mispredicted branch or to another point that the data processor can determine, from information regarding the instruction that was mis-predicted. In such a case the two program counters need to be forced to indicate that value and the data store needs to be flushed. Processing can then start again from this point.

Although the data store can be implemented in a number of ways, in some embodiments it is found to be convenient to implement as a first in first out (FIFO) buffer, while in others it is implemented as a circular buffer.

Although the instructions can be stored in a number of different memory arrangements, it is found convenient to store them in some embodiments in an instruction cache.

A further aspect of the present invention provides a method of prefetching instructions from a stream of instructions prior to sending said stream of instructions to a processor comprising the steps of: fetching instructions from within said stream of instructions from a memory; accessing a branch target cache that stores predetermined information about branch operations executed by said processor said predetermined information comprising: identification data for an instruction specifying a branch operation and data relating to whether said branch is taken or not, to determine if there is predetermined information corresponding to instructions within said stream of instructions stored within said branch target cache and outputting said data to a data store; storing data indicative of a behaviour of a branch instruction derived from said output data; and accessing said data store to determine if there is data corresponding to an instruction, stored within said data store that indicates that said instruction specifies a branch operation that will be taken and will cause a change in instruction flow and if there is retrieving said data and using said retrieved data to amend which instructions are to be fetched from said memory; wherein said step of accessing said branch target cache is such that within a predetermined time, predetermined information relating to more instructions is accessed within said branch target cache than instructions are prefetched from said memory such that said accesses to said branch target cache develop an advance in said instruction stream with respect to accesses to said memory.

A still further aspect of the present invention provides a means for processing data comprising: a processing means for processing a stream of decoded instructions; a prefetching means for fetching instructions within a stream of instructions from a means for storing instructions prior to sending said stream of instructions to said processing means; predicting means for predicting a behaviour of branch instructions; cache storing means for storing predetermined information about branch operations executed by said processor, said predetermined information comprising: identification data for an instruction specifying a branch operation and data relating to whether a branch is taken or not; wherein said means for processing data is operable to access said cache storing means and to determine if there is predetermined information corresponding to instructions within said stream of instructions stored within said cache storing means and if there is to output said data; said means for processing data further comprising: a data storage means operable to store data indicative of a behaviour of a branch instruction derived from said data output from said cache storing means; wherein said means for processing data is operable over a period of time to access predetermined information corresponding to more instructions within said cache storing means than instructions it prefetches from said means for storing instructions such that said accesses to said cache storage means develop an advance in said instruction stream with respect to accesses to said means for storing instruction; and said prefetching means for fetching instructions is operable to access said data storage means and to determine if there is data corresponding to an instruction within said data storage means that indicates that said instruction specifies a branch operation that will be taken and will cause a change in instruction flow.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 shows a data store for storing data indicative of a behaviour of a branch instruction.

DESCRIPTION OF THE PREFERRED EMBODIMENTS

Figure 1:
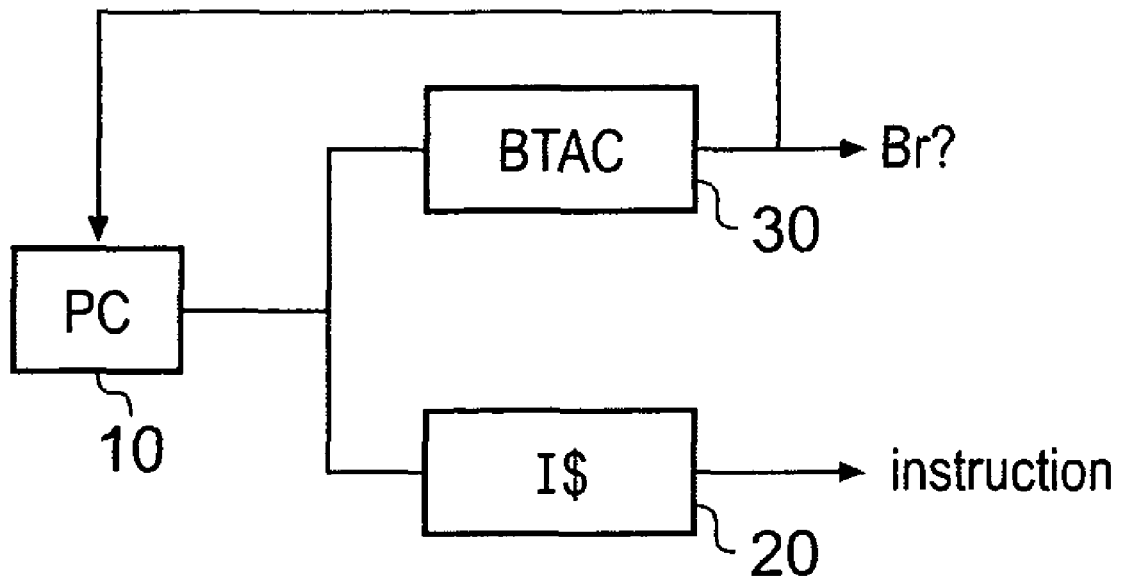
FIG. 1 schematically illustrates a prefetch unit and data processing apparatus and a timing diagram of instruction cache and BTAC accesses according to the prior art.
Figure 2:
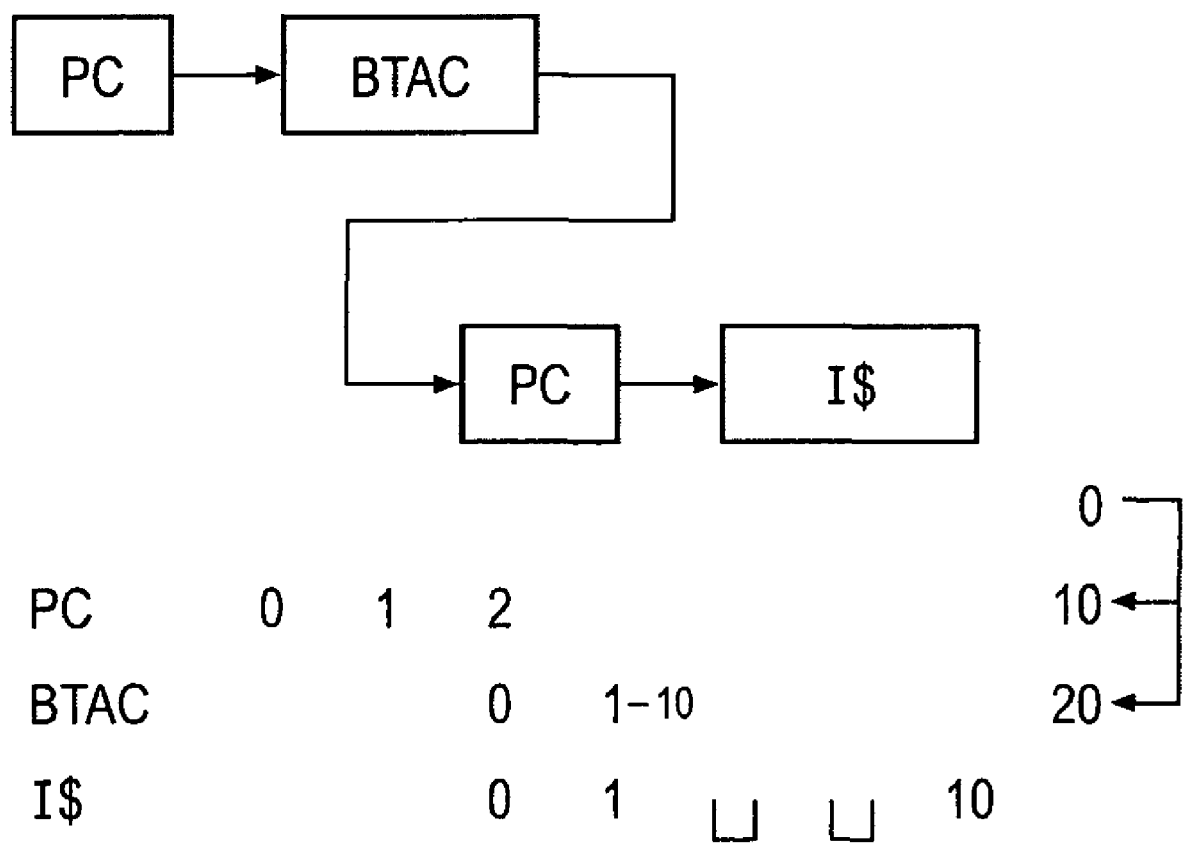
FIG. 2 schematically illustrates a prefetch unit and diagram according to an alternative technique of the prior art.
Figure 3:
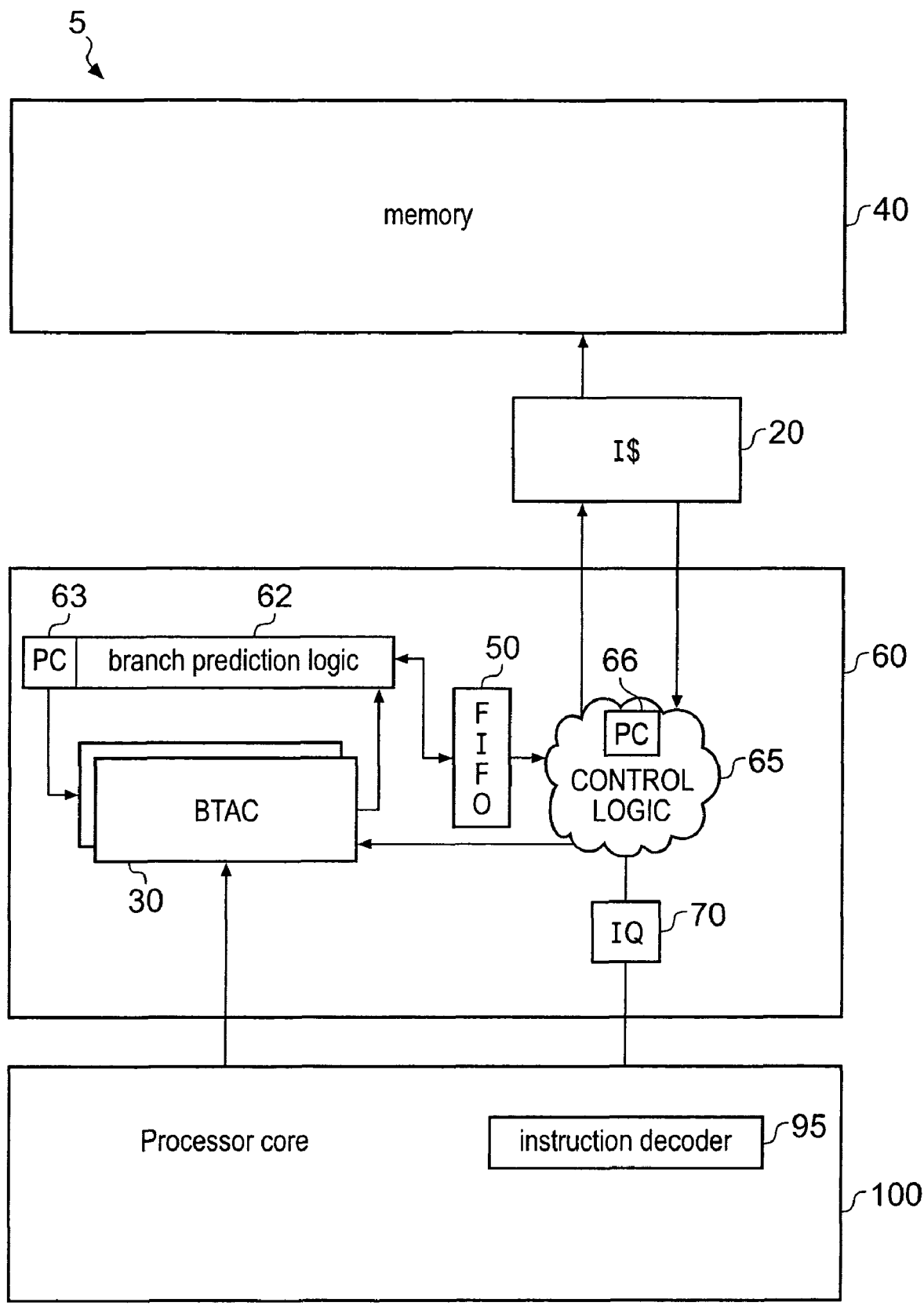
FIG. 3 schematically illustrates a data processing apparatus according to an embodiment of the present invention.

FIG. 3 schematically shows a data processing apparatus 5. Data processing apparatus 5 comprises a memory 40 which although in this embodiment is shown as being within the data processing apparatus, could be located outside of it and an instruction cache I-cache 20, both operable to store instructions. Data processing apparatus 5 also comprises a prefetch unit 60 for fetching instructions in an instruction stream from the I-cache 20 or if they are not present in the instruction cache 20, from memory 40 and sending these instructions to processor core 100 and in particular to the instruction decoder 95 within the processor core for decoding and execution. Thus, a stream of instructions from a program are fetched by prefetch unit 60 and are sent to the processor for processing.

Within the prefetch unit 60, there is dynamic branch prediction logic 62. Dynamic branch prediction logic 62 uses historical information about what happened one or more times that a particular branch operation was encountered to predict what may happen next time. In this embodiment, historical information is stored within a branch target cache, BTAC 30. This BTAC 30 is controlled by processing core 100. It should be understood that in some embodiments the BTAC could be controlled by control logic within the prefetch unit itself. There is also a program counter PC 63 associated with the branch prediction logic 62. This program counter determines which instructions are looked up in the BTAC 30, and in the case of one of the instructions that are looked up being predicted as a taken branch, it is updated to the target address of that branch.

In this embodiment the BTAC 30 is a two way set associative cache and stores twice as much data per line as the instruction cache.

The data processing apparatus 5 also comprises a FIFO buffer 50 located between the BTAC 30 and control logic 65 and an instruction queue buffer 70. Control logic 65 comprises a program counter PC 66 which determines which instruction is to be fetched from the I-cache 20.

Operation of the data processing apparatus illustrated in FIG. 3 and in particular of the prefetch unit 60 of this apparatus will now be described with respect to FIG. 4.

Figure 4:
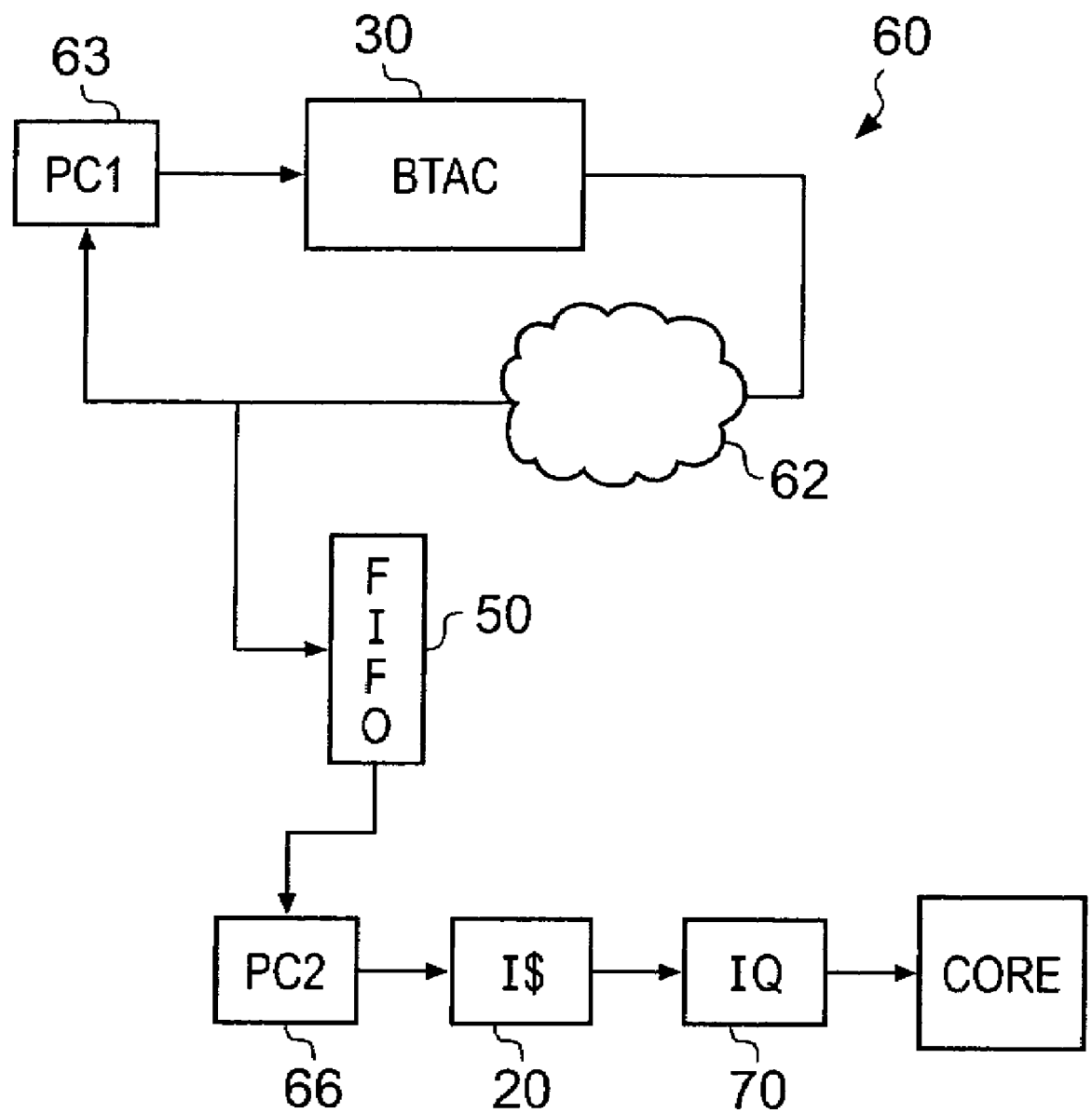
FIG. 4 schematically illustrates a portion of the data processing apparatus of the FIG. 3.

FIG. 4 schematically illustrates portions of the data processing apparatus of FIG. 3 in a functional manner. In this embodiment, a program counter PC1, which is the program counter 63 located in branch prediction logic 62 in FIG. 3 is used to indicate the instruction sequence which occurs or is predicted to occur in the instruction stream. The BTAC 30 is accessed and the value in PC1 is compared with the program counter values of the various branch operations recorded within the BTAC memory. If the program counter value matches one of the program counter values for an entry in the BTAC 30 this indicates that the instruction to be retrieved is a branch instruction and historical data for this branch can be retrieved. This is then sent to the dynamic branch prediction logic 62 which predicts whether that branch will be taken. Accordingly, the contents for the relevant entry within BTAC memory are output to the dynamic branch prediction logic 62 to enable that logic to determine whether that branch will be taken or not. As will be appreciated by those skilled in the art, many branch prediction schemes exist and accordingly will not be described in further detail herein. The dynamic branch prediction logic predicts a target address of a branch if it is predicted as taken and this is output and stored in FIFO 50. This value is also used to update PC1.

In this embodiment, the branch target cache is a two way set associative cache and thus information from the program counter indicating an instruction is issued to the BTAC along with this value incremented by one such that information relating to two instructions is requested from the BTAC 30 at the same time. It is for this reason that there are two separate PCs, PC1 for the BTAC and another PC2 for the I-cache. As two instructions are accessed at the same time in BTAC 30 then PC1 will be incremented faster than PC2 and will gradually take an advance on it.

Any data stored in the BTAC relating to these two instructions is sent to branch prediction logic and if a branch is predicted the target address is output and stored in FIFO buffer 50.

Program counter PC2 66 is used to access the instruction cache 20 and an instruction to be retrieved from the instruction cache 20 is indicated by this value. Thus, an instruction corresponding to the PC2 value is retrieved from the instruction cache and in this embodiment is sent to the instruction queue buffer 70. If a branch is predicted as taken a target address for that branch is stored in the FIFO 50 and this can be used to update PC2, such that a fetched instruction is associated with a value stored in FIFO 50, PC2 is updated to the target address associated with that value in FIFO 50.

Initially, PC1 and PC2 have the same value and thus a request for the same instruction is sent to both the BTAC 30 and instruction cache 20 and thus, prediction information for this instruction if it is a branch instruction and its subsequent instruction is derived from the BTAC at the same time as the first instruction is retrieved from the instruction cache. Thus, if this instruction is a branch instruction, this information is only known at this moment. If it is a branch instruction, and the branch is predicted as taken, then this information is fed back to force the program counters PC1 and PC2 to the target address of this branch instruction. As there is a two cycle latency in the instruction cache accesses, there is a delay before the next instruction which is the target of the branch can be retrieved from the instruction cache, as the information about the branch instruction was only known at the moment that this instruction was output from the instruction cache. This two cycle latency will appear as bubbles in the stream of instructions output from the instruction cache. The bubbles can be removed via the use of the cache FIFO or instruction queue 70.

If the first instruction is not a branch instruction then as two instructions are looked up in the BTAC for every one instruction that is accessed in the cache the BTAC gradually takes an advance in the instruction stream on the instruction cache, such that if a branch instruction is encountered later in the instruction stream, this predicted information can be sent to the program counter PC2 controlling the instruction cache retrieval prior to the previous instruction being retrieved from the instruction cache. Thus, the two cycle latency will not appear in the output and unnecessary instruction cache look-ups will also be avoided.

It should be noted, that as the BTAC prediction is in advance of the I-cache prediction, when it predicts a branch then it changes the program counter PC1 that is controlling it to indicate that branch and thus, if a branch follows a branch in this embodiment, provided PC1 is sufficiently far in advance of the PC2 then this information will be available to the instruction cache at the time that the previous instruction is accessed and latency can be reduced.

Clearly, the FIFO 50 has a finite size and it may be that accesses to the BTAC 30 get to be in advance of the instruction cache 20 by a large amount and thus the FIFO 50 becomes full. In such a case, accesses to the BTAC are simply stalled. This is not a problem as clearly in this case there is a lot of information stored in the FIFO waiting for the instruction cache.

In this respect, it should be noted that on retrieving information from the FIFO relating to an instruction that is to be fetched from the instruction cache, this information is deleted from the FIFO such that in effect the data in the FIFO will reflect the number of branch instructions that the BTAC accesses are in advance of the I-cache accesses.

In the case of a mis-prediction by BTAC and the logic associated with it, this information is sent back to the prefetch unit from the processor core and the program counters controlling both the BTAC accesses and instruction cache accesses are forced to a value indicating the instruction that was mis-predicted or a newly predicted target of that instruction.

Figure 5:
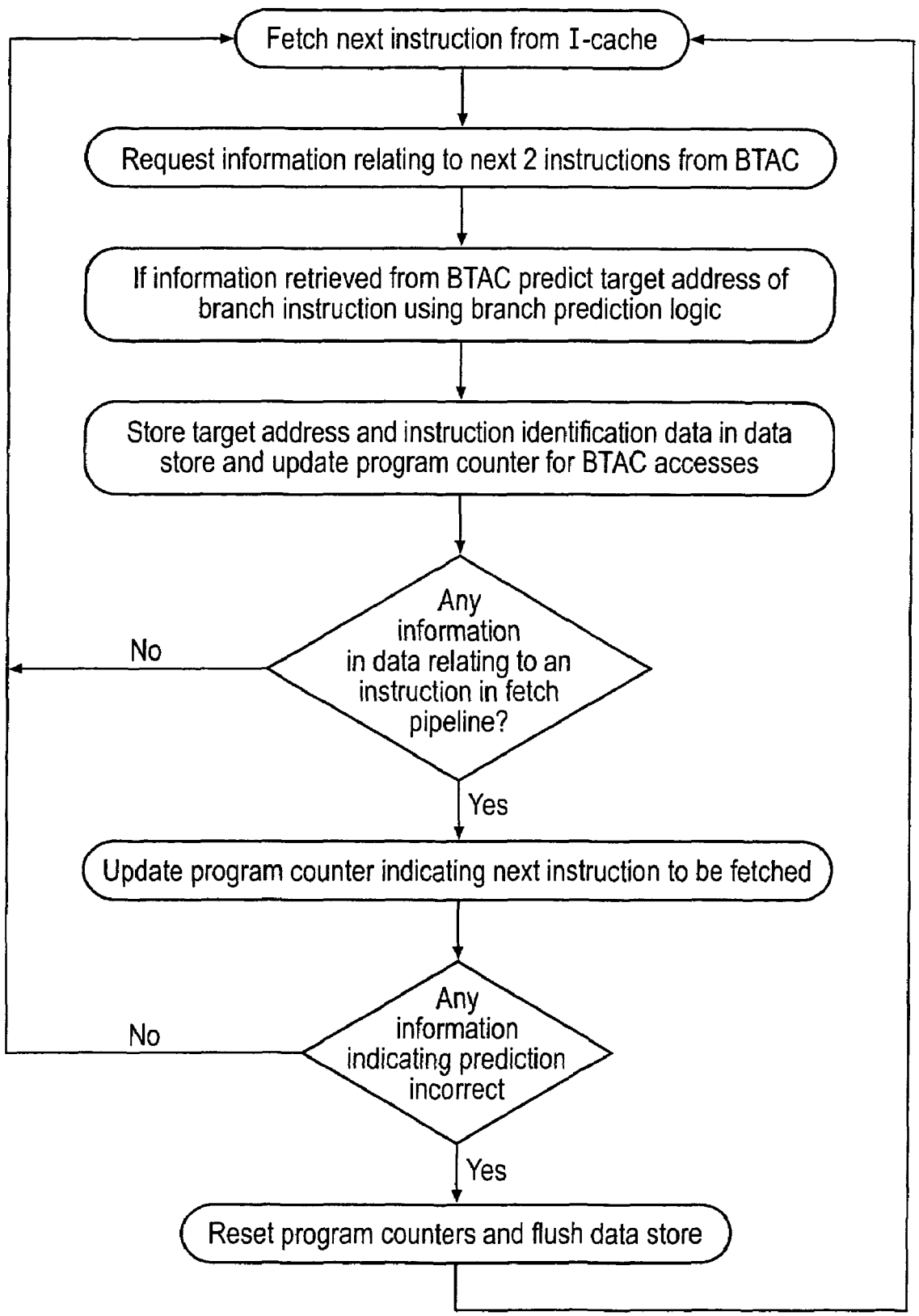
FIG. 5 illustrates a flow diagram showing effects of the method according to an embodiment of the present invention.

FIG. 5 shows a method according to embodiment of the present invention. In the first step an instruction is fetched from the instruction cache and information for that instruction and its subsequent instruction is requested from the BTAC. Although this is shown as one step following another, it should be appreciated that in fact these two steps are performed at the same time. Any data relating to the access to the BTAC is sent to branch prediction logic and a predicted target address is retrieved and stored in the data store. The data store is then examined to see if there is any information there relating to the fetched instruction. If there is then the program counter is updated to indicate what the next instruction to be fetched from the instruction cache is to be. If there is no data the program counter is incremented in the normal way and the next instruction is fetched. In this respect it should be noted that the next two instructions requested from the BTAC are not the next instruction fetched from the I-cache plus one, they are in fact the next instructions following on from the previous instructions fetched from the BTAC. Thus, fetching data relating to two instructions from the BTAC while only fetching a single instruction from the I-cache means that the accesses to the BTAC get further and further advanced in the instruction stream relative to the accesses to the I-cache.

If there is information relating to the fetched instruction in the BTAC then the program counter is updated indicating this next instruction to be fetched. The data processing apparatus also indicates if previous predictions were mis-predicted at some point in the cycle, and if they were it resets the program counter to an appropriate value depending on the branch that was mis-predicted and the data store is flushed. At this point the instruction cache and BTAC look for the same instruction again although the BTAC clearly looks for the same instruction and its subsequent one.

FIG. 6 illustrates the data store 50. Data store 50 comprises 2 FIFO buffers 52 and 54. FIFO buffer 52 is large enough to store a number of small entries, while second FIFO buffer 54 stores fewer larger entries. The first FIFO buffer 52 stores data relating to each instruction for which an access to the BTAC has been made. In other words instructions specified by program counter 63. This data includes information as to whether the instruction is predicted by the branch prediction logic to be a branch instruction. If it is then there is a corresponding longer entry stored in the second portion 54. This includes the data retrieved from the BTAC and the target instruction predicted by branch prediction logic. Thus, on detection of the flag the second portion can be accessed. This avoids the need for long comparators to compare the instruction identification data to learn if the instruction specified by the program counter 66 is a branch instruction or not for each instruction. Rather as data for all instructions in the instruction stream are stored then entry after entry can be checked in the first portion as the program counter 66 is incremented. Only if the flag indicates a branch need the second buffer 54 be accessed.

As the second buffer 54 stores a significant amount of data for a single instruction, it is generally not a large buffer and thus, may become full in the case of several branch instructions close to each other in the instruction stream. In such a case, the BTAC accesses are not stalled and rather a further flag 57 is set to indicate that there should be, but is not, a corresponding entry in the second buffer. In response to detecting this second flag the data processing apparatus accesses the BTAC for this instruction and retrieves the necessary branch information. If the BTAC accesses become a long way in advance of the instruction fetches then the first buffer 52 becomes full and at this point the BTAC is stalled until retrieval of data from the first buffer resulting in its eviction provides a further space for data storage.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
    a processor for processing a stream of decoded instructions;
    a prefetch unit for fetching instructions within a stream of instructions from a memory prior to sending said stream of instructions to said processor;
    branch prediction logic configured to predict a behavior of a branch instruction;
    a branch target cache for storing predetermined information about branch operations executed by said processor, said predetermined information comprising: identification data for an instruction specifying a branch operation and data relating to whether said branch is taken or not; wherein said data processing apparatus is configured to access said branch target cache and to determine if there is data corresponding to instructions within said stream of instructions stored within said branch target cache and, if there is, to output said data, wherein said branch prediction logic is configured to predict from said data output by said branch target cache whether said instruction specifies a branch operation that will be taken and will cause a change in instruction flow, and, if so, output a target address from which a following instruction should be fetched;
    a data store for storing data indicative of a behavior of said branch instruction, wherein said data store comprises two portions, and for each instruction for which an access is made to said branch target cache, data relating to said instruction is stored in a first portion, and for instructions that said branch prediction logic predict to be branch instructions further data including said target address are stored in a second portion, a flag is set in said first portion to indicate storage of said further data; and
    said data processing apparatus, over a period of time, is configured to access predetermined information corresponding to more instructions within said branch target cache than instructions it prefetches from said memory such that said accesses to said branch target cache develop an advance in said instruction stream with respect to accesses to said memory; and
    said prefetch unit is configured to access said data store and to determine if there is data corresponding to an instruction within said data store that indicates that said instruction specifies a branch operation that will be taken and will cause a change in instruction flow.

2. A data processing apparatus according to claim 1, wherein said data processing apparatus is operable after retrieving said data from said data store to evict said data from said data store.

3. A data processing apparatus according to claim 1, wherein said data processing apparatus is operable to retrieve data from said first portion for each instruction and in response to detecting said flag to retrieve data from said second portion and after retrieving said data from said data store to evict said data from said data store.

4. A data processing apparatus according to claim 1, wherein said data processing apparatus is configured, in response to detecting said first portion of said data store is full, to stall operation of said branch target cache until data has been evicted from said data store.

5. A data processing apparatus according to claim 1, wherein said data processing apparatus is configured, in response to detecting said second portion of said data store is full, to indicate via a further flag in said first portion of said data store that said instruction is a branch instruction for which no information is stored in said second portion and said data processing apparatus is further configured, in response to detecting said further flag, to perform branch prediction for said instruction when said instruction is fetched.

6. A data processing apparatus according to claim 1, said data processing apparatus further comprising:
    a first program counter indicating an instruction to be fetched from memory;

a second program counter indicating an instruction to be accessed in said branch target cache; wherein said second program counter has a value equal to or in advance in said instruction stream to a value in said first program counter;

said branch prediction logic is operable in response to predicting said predetermined information output from said branch target cache corresponds to an instruction that specifies a branch operation that will be taken to update said second program counter to said target address of said branch; and said prefetch unit is operable to access said data store and to determine if there is data corresponding to a value of said first program counter stored within said data store and if there is to retrieve said data and to update said first program counter with a value of said target address stored associated with said value.

7. A data processing apparatus according to claim 1, wherein said data processing apparatus is operable to access predetermined information corresponding to at least two instructions within said branch target cache for at least some of said branch target accesses and to output said predetermined information.

8. A data processing apparatus according to claim 7, wherein said branch target cache comprises a set associative cache comprising at least two ways.

9. A data processing apparatus according to claim 1, wherein said data processing apparatus is operable to access said branch target cache more frequently than it accesses an instruction cache.

10. A data processing apparatus according to claim 6, wherein said data processing apparatus is operable to resolve if a branch is taken or not and in response to detecting that a branch has been mispredicted is operable to reset said first and second program counters and flush said data store.

11. A data processing apparatus according to claim 1, wherein said data store is a first in first out (FIFO) buffer.

12. A data processing apparatus according to claim 1, wherein said data store is a circular buffer.

13. A data processing apparatus according to claim 1, wherein said memory comprises an instruction cache.

14. A method of prefetching instructions from a stream of instructions prior to sending said stream of instructions to a processor comprising the steps of:

fetching instructions from within said stream of instructions from a memory;

accessing a branch target cache that stores predetermined information about branch operations executed by said processor, said predetermined information comprising: identification data for an instruction specifying a branch operation and data relating to whether said branch is taken or not, to determine if there is data corresponding to instructions within said stream of instructions stored within said branch target cache and outputting said data corresponding to instructions to a data store;

determining, from said output data using branch prediction logic, whether said instruction specifies a branch operation that will be taken and will cause a change in instruction flow, and, if so, outputting a target address from which a following instruction should be fetched;

storing data in a data store, said stored data indicative of a behavior of a branch instruction, wherein said data store comprises two portions, and for each instruction for which an access is made to said branch target cache, data relating to said instruction is stored in a first portion, and for instructions that said branch prediction logic predict to be branch instructions further data including said target address are stored in a second portion, a flag is set in said first portion to indicate storage of said further data; and accessing said first portion of said data store to determine if said flag in said first portion is set and, if it is set, accessing said second portion to access said further data and using said further data to amend which instructions are to be fetched from said memory; wherein said step of accessing said branch target cache is such that within a predetermined time, predetermined information relating to more instructions is accessed within said branch target cache than instructions are prefetched from said memory such that said accesses to said branch target cache develop an advance in said instruction stream with respect to accesses to said memory.

15. A means for processing data comprising:

a processing means for processing a stream of decoded instructions;

a prefetching means for fetching instructions within a stream of instructions from a means for storing instructions prior to sending said stream of instructions to said processing means;

predicting means for predicting a behavior of a branch instruction;

cache storing means for storing predetermined information about branch operations executed by said processing means, said predetermined information comprising: identification data for an instruction specifying a branch operation and data relating to whether a branch is taken or not; wherein said means for processing data is configured to access said cache storing means and to determine if there is predetermined information corresponding to instructions within said stream of instructions stored within said cache storing means and, if there is, to output said data, wherein said predicting means is configured to predict from said data output by said cache storing means whether said instruction specifies a branch operation that will be taken and will cause a change in instruction flow, and, if so, output a target address from which a following instruction should be fetched;

data storage means for storing data indicative of said behavior of said branch instruction, wherein said data storage means comprises two portions, and for each instruction for which an access is made to said cache storage means, data relating to said instruction is stored in a first portion, and for instructions that said predicting means predicts to be branch instructions further data including said target address are stored in a second portion, a flag is set in said first portion to indicate storage of said further data; wherein said means for processing data is configured to access predetermined information corresponding to more instructions within said cache storing means than instructions it prefetches from said means for storing instructions such that said accesses to said cache storage means develop an advance in said instruction stream with respect to accesses to said means for storing instruction; and said prefetching means for fetching instructions is configured to access said data storage means and to determine if there is data corresponding to an instruction within said data storage means that indicates that said instruction specifies a branch operation that will be taken and will cause a change in instruction flow.

* * * * *